US008527982B1

United States Patent
Sapuntzakis et al.

(10) Patent No.: US 8,527,982 B1
(45) Date of Patent: Sep. 3, 2013

(54) AUTO INSTALL VIRTUAL MACHINE MONITOR

(75) Inventors: Constantine P. Sapuntzakis, Mountain View, CA (US); Michael K. Chen, Palo Alto, CA (US); John C. Whaley, San Mateo, CA (US)

(73) Assignee: moka5. Inc., Redwood City, CA (US)

( * ) Notice: Subject to any disclaimer, the term of this patent is extended or adjusted under 35 U.S.C. 154(b) by 1135 days.

(21) Appl. No.: 12/014,074

(22) Filed: Jan. 14, 2008

Related U.S. Application Data

(60) Provisional application No. 60/884,859, filed on Jan. 12, 2007.

(51) Int. Cl.
*G06F 9/445* (2006.01)

(52) U.S. Cl.
USPC .......................... 717/174; 717/175; 717/176

(58) Field of Classification Search
USPC .......................................................... 717/174
See application file for complete search history.

(56) References Cited

U.S. PATENT DOCUMENTS

| 7,577,722 | B1 * | 8/2009 | Khandekar et al. | 709/220 |
|---|---|---|---|---|
| 7,793,279 | B1 * | 9/2010 | Le et al. | 717/168 |
| 7,849,267 | B2 * | 12/2010 | Lam et al. | 711/115 |
| 7,865,893 | B1 * | 1/2011 | Omelyanchuk et al. | 718/1 |
| 7,954,150 | B2 * | 5/2011 | Croft et al. | 726/21 |
| 8,266,616 | B1 * | 9/2012 | Jacquot et al. | 717/177 |
| 2005/0125513 | A1 * | 6/2005 | Sin-Ling Lam et al. | 709/220 |
| 2006/0101189 | A1 | 5/2006 | Chandrasekaran et al. | |
| 2006/0225065 | A1 * | 10/2006 | Chandhok et al. | 717/168 |
| 2006/0277542 | A1 | 12/2006 | Wipfel | |
| 2007/0006205 | A1 | 1/2007 | Kennedy et al. | |
| 2007/0074191 | A1 * | 3/2007 | Geisinger | 717/148 |
| 2007/0074192 | A1 * | 3/2007 | Geisinger | 717/148 |
| 2007/0089111 | A1 | 4/2007 | Robinson et al. | |
| 2007/0130366 | A1 * | 6/2007 | O'Connell et al. | 709/238 |
| 2007/0162521 | A1 | 7/2007 | Raghunath | |
| 2007/0180493 | A1 * | 8/2007 | Croft et al. | 726/2 |
| 2007/0198713 | A1 | 8/2007 | Tsao et al. | |
| 2007/0234302 | A1 * | 10/2007 | Suzuki et al. | 717/126 |
| 2007/0234356 | A1 * | 10/2007 | Martins et al. | 718/1 |
| 2007/0283324 | A1 * | 12/2007 | Geisinger | 717/120 |
| 2007/0300221 | A1 * | 12/2007 | Hartz et al. | 718/1 |
| 2008/0104588 | A1 | 5/2008 | Barber et al. | |
| 2008/0168188 | A1 * | 7/2008 | Yue et al. | 710/15 |
| 2008/0301676 | A1 * | 12/2008 | Alpern et al. | 718/1 |
| 2009/0113424 | A1 * | 4/2009 | Chen et al. | 718/1 |
| 2009/0282404 | A1 * | 11/2009 | Khandekar et al. | 718/1 |

FOREIGN PATENT DOCUMENTS

| JP | 2006072591 A | 3/2006 |
|---|---|---|
| WO | 2006/036277 A2 | 4/2006 |
| WO | 2007/149671 A2 | 12/2007 |

\* cited by examiner

*Primary Examiner* — Matt Kim
*Assistant Examiner* — Hua Lu
(74) *Attorney, Agent, or Firm* — Park, Vaughan, Fleming & Dowler, LLP

(57) ABSTRACT

Systems and methods for detecting, installing and uninstalling a virtual machine monitor on a host device is provided. In general, in one aspect, a computer implemented method is provided. The computer implemented method includes initiating a user session on a host device, where the user session is initiated upon the insertion of a peripheral device into the host device. Additionally, a virtual machine monitor and a virtual machine are stored on the peripheral device and the virtual machine monitor is automatically installed on the host device. In some implementations, the virtual machine monitor is automatically uninstalled when the user session is terminated.

31 Claims, 6 Drawing Sheets

AUTO INSTALL VIRTUAL MACHINE MONITOR

CROSS REFERENCE TO RELATED APPLICATIONS

This application claims benefit under 35 U.S.C. §119(e) of U.S. Patent Application No. 60/884,859, filed Jan. 12, 2007, which is incorporated herein by reference.

BACKGROUND

This specification relates to detecting, installing and uninstalling a virtual machine monitor on a host device.

A virtual machine is a software construct that appears to be hardware on which a guest operating system and applications can be installed. In an emulator implementation, the virtual machine is an emulator, simulating all of the hardware used by the guest operating system and applications. In para-virtualization, the virtual machine allows the guest operating system and applications to run on the host hardware, but requires that the guest operating system be modified to use a special API (application programming interface) to run on the virtual machine monitor. In machine-level or full virtualization, the virtual machine allows a guest operating system that is implemented for the underlying host processor to be run without modification.

Platform virtualization can be performed on a given hardware platform by host software (e.g., a control program), which creates a simulated computer environment (e.g., a virtual machine) for its guest software. The guest software functions as though it were installed on a stand-alone hardware platform. Platform virtualization includes the virtualization of specific system resources, such as storage volumes, name spaces, and network resources.

In a para-virtualization or a machine-level virtualization implementation, a virtual machine monitor is used to bind the virtual machine to the underlying host hardware. In some architectures, the virtual machine monitor runs directly on the host hardware in a hypervisor configuration. In others, it runs as an application on the host operating system.

Virtual machine monitors ("VMM"), (e.g., VMware Inc.'s Player, Parallels Inc. Desktop for Mac or Microsoft Inc.'s Virtual PC), emulate computer hardware in software. This emulation allows software running on the hardware to see a constant view of the memory, the I/O chipset and the peripheral devices. The virtual machine monitors facilitate the portability of operating systems, installed applications and user environments between different host devices. A virtual machine ("VM") can be one or more operating system containing applications and user environments (e.g., different operating systems installed on different partitions). By storing a personal virtual machine on a peripheral device (e.g., a portable storage device including a 1.8" hard drives or flash memory connected to a host computer via high speed interface like USB or Firewire), users can carry around their personal computing environment without having to carry a laptop computer.

A host device can include a VMM to run a VM. Unfortunately, a host device may not have a VMM available. In this case, the user must manually install a VMM. If the user or the host device does not want the VMM left behind after it is used to run the VM, the user must also manually uninstall the VMM. Additionally, currently most peripheral devices have capacities that range from 1 GB to 80 GB, and thus copying the entire contents of the peripheral device to the host device can take minutes. Finally, transfer of private data to local storage of a host device can make the data more vulnerable to unauthorized access.

SUMMARY

In general, in one aspect, a computer-implemented method is provided. The computer-implemented method includes initiating a user session on a host device, where the user session is initiated upon the insertion of a peripheral device into the host device. Additionally, a virtual machine monitor and a virtual machine are stored on the peripheral device and the virtual machine monitor is automatically installed on the host device. In some implementations, the virtual machine monitor is automatically uninstalled when the user session is terminated.

Embodiments of this aspect can include apparatus, systems, and computer program products.

Implementations of the method, computer program product and system can optionally include one or more of the following features. The virtual machine monitor can be uninstalled using a monitoring service. Additionally, the user session can be terminated when the peripheral device is removed from the host device, when the peripheral device is removed from the host device and a time period has elapsed, when the virtual machine stops, when a failure condition occurs on the host device, and when a user interface is closed. In some implementations, one or more copies of one or more files associated with the virtual machine monitor can be installed and uninstalled on the host device.

In some implementations, the original configuration of the host device can be stored. In those implementations, after the original configuration of the host device is stored, the host device can be configured to run the virtual machine monitor from the peripheral device. Additionally, after the host device runs the virtual machine monitor from the peripheral device, the original configuration of the host device can be restored.

Particular embodiments of the subject matter described in this specification can be implemented to realize one or more of the following advantages. The automatic install and uninstall of the VMM on the host device is fully integrated with the execution of the VM. This eliminates the need to manually install and uninstall the VMM on the host computer and reduces the possibility of leaving any files behind on the host device (e.g., when the user forgets to uninstall the VMM).

In one embodiment a launcher copies a monitoring service to the host device. The monitoring service copies a VMM package from the peripheral device and uses it to install the VMM on the storage of host device. To make the user experience seamless and automatic, the user is asked a minimum amount of questions during the install of the VMM. In some implementations, the user is not asked any questions during the install of the VMM, making the install completely automatic (e.g., no wizard). The storage on the host device is accessible to the user who started the launcher. While the copying of the VMM execution binaries to the host device is not strictly necessary to run a VM from the portable storage device, it does provide several key enhancements to the system.

For example, bandwidth and access latencies to a peripheral device have historically been slower than to the local storage on the host device (e.g., because many peripheral devices have been designed to scale storage capacity faster than performance). Thus, a system can achieve better performance by executing the VMM from the local storage on the host device, than by running directly from the peripheral device.

Additionally, certain peripheral devices (e.g., flash memory and R/W optical media), have limited write cycles before one or more parts of the media on the peripheral device become unusable. Thus, by executing the VMM from the local storage on the host device, the writes to the peripheral device are reduced, which can increase the lifetime of the peripheral device. By executing the VMM on the local storage of the host device, the VMM can monitor all accesses to the peripheral device.

Some peripheral devices can be removed inadvertently by the user when a VM stored on the peripheral device is running. The inadvertent removal of the peripheral device can result in fatal and ungraceful termination of the running VM. By executing the VMM on the local storage of the host device, the VMM can monitor all accesses to the peripheral device. Thus, in the event the peripheral device is removed while a VM is running, the accesses can be trapped (e.g., by the VMM), and a dialog can be presented to the user to re-insert the peripheral device, or the running VM can be terminated with fewer or no cryptic error messages.

The program binaries to remove the automatic instance of the VMM can reside on the host device. Thus, the VMM can be removed in the background and the user can remove the peripheral device immediately after quitting the VMM. Additionally, the VMM can be completely removed and the host device cleaned even if the peripheral device is removed while a VM is still running.

The entire contents of the peripheral device (e.g., VMs and user data) need not be copied to the host device. Thus, the overhead of copying the VMM to the host device can be minimized. In some implementations, the VMM is much smaller than the user data and applications on the peripheral device. Additionally, the size of the VMM is constant regardless of the size of the peripheral device. In one embodiment, the VMM is less than 20 MB. Given current peripheral device transfer rates of at least 10 MB/s, the time to transfer the VMM is on the order of several seconds. Finally, user data and applications blocks can be read directly from the peripheral device by the VMM.

The details of one or more embodiments of the invention are set forth in the accompanying drawings and the description below. Other features, aspects, and advantages of the invention will become apparent from the description, the drawings, and the claims.

DESCRIPTION OF DRAWINGS

Like reference symbols in the various drawings indicate like elements.

DETAILED DESCRIPTION

Figure 1:
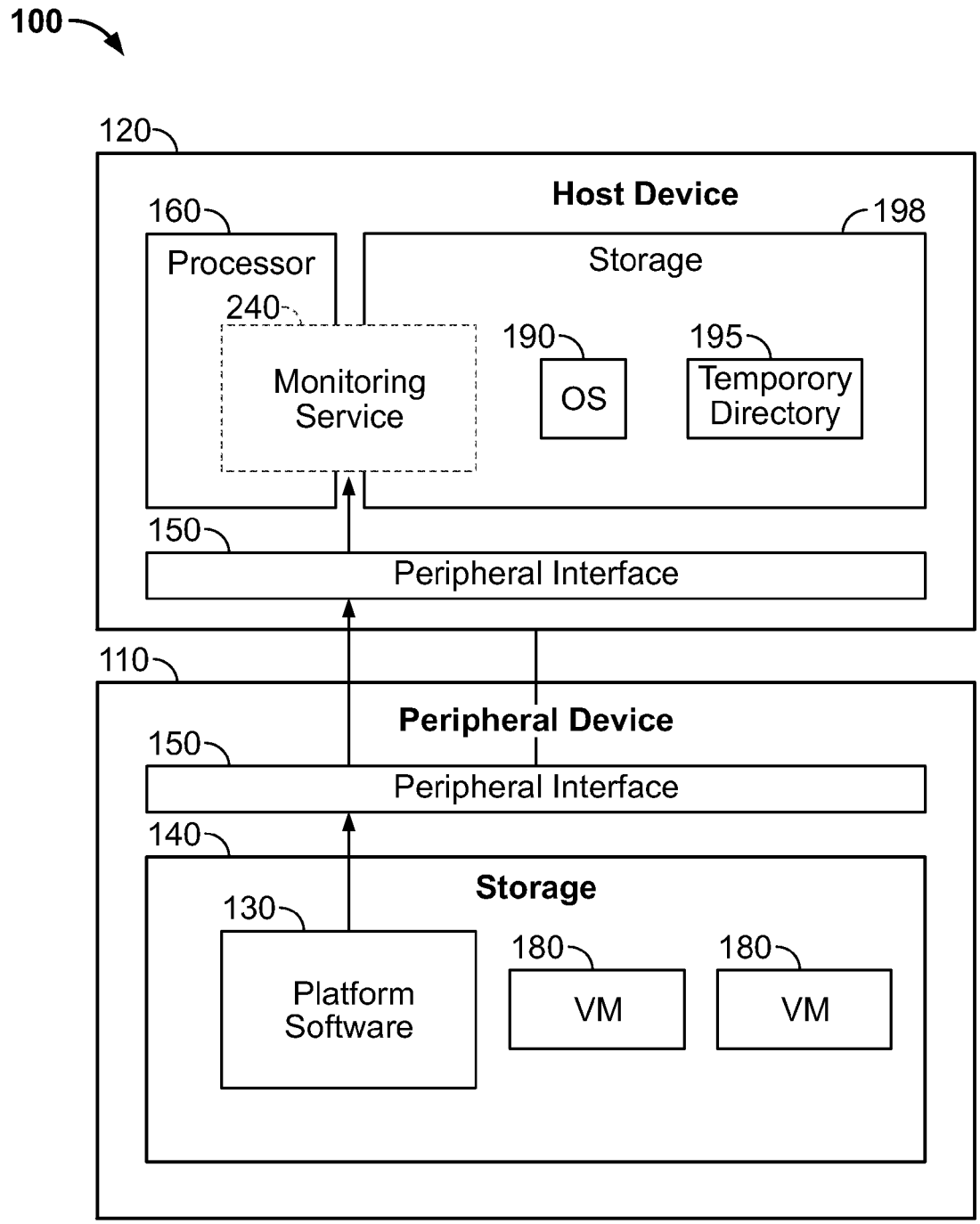
FIG. 1 illustrates an example network configuration for a system capable of automatically installing and uninstalling a virtual machine monitor.

FIG. 1 illustrates an example network configuration for a system 100 capable of automatically installing and uninstalling a VMM. Using a peripheral device 110 comprising platform software (e.g., a LivePC™ Engine like that manufactured and distributed by Moka5 of Redwood City, Calif. and available from http://www.moka5.com), the functionality of the peripheral device 110 is augmented by leveraging resources (e.g., CPU, network, storage) on the host device 120.

FIG. 1 shows an example peripheral device 110 which has a connector or wireless transceiver (e.g., USB or USB wireless interface) that allows the peripheral device 110 to interface with a host device 120. Peripheral device 110 includes data storage 140 (e.g., USB mass storage class device), which can be accessed and updated over a peripheral interface 150. The peripheral interface 150 can be operable for coupling to a peripheral device 110 (e.g., a removable peripheral device). The data storage 140 can contain platform software 130 (e.g., FAT file-system with software preloaded).

A peripheral device 110 can be any device having a memory storage that is accessible by a host device 120. A peripheral device 110 can also be any device capable of communicating with another device (e.g., a host device 120). A removable peripheral device 110 can be operable to store a portable computing environment. Examples of peripheral devices 110, can include, but are not limited to portable storage devices, game controllers, headsets, webcams, optical media drives, musical instruments, keyboards, mice, microphones, television tuners, digital cameras, video cameras, stereo receivers, audio receivers, cellular phones (and any other device utilizing cellular technology), scanners, headphones, printers, personal health monitors (and any other health related monitoring apparatus), and PIN pads.

In some implementations, the data storage 140 in the peripheral device 110 can contain one or more VMs 180. A VM 180 can include an operating environment, application software (e.g., peripheral device specific software), configuration settings, user data (e.g., from previous user interaction with the particular software bundle), code, libraries, or device drivers capable of providing the user with the ability to use the device for a particular use case. A different VM 180 can exist and be run on each host device 120 based on the host device 120 architecture (e.g., a cell phone version of the VM 180 for a cell phone architecture or personal computer version of the VM 180 for a personal computer architecture).

A host device 120, can be any device capable of communicating with another device (e.g., peripheral device 110). Examples of a host device 120 can include, but are not limited to, personal computers, personal digital assistants, cellular telephones, media player/recorder, television set-top box, game console, and tablets. Host device 120 can include a peripheral interface connector or wireless transceiver (e.g., Firewire, Ethernet, USB interface, or USB wireless interface), capable of supporting data transfers to and from the peripheral device 110. Host device 120 can also include system software (e.g., Windows XP or modern PC BIOS), capable of accessing data storage 140 exposed over the peripheral interface 150.

In some implementations, host device 120 can include software that can automatically launch (e.g., by default), a designated or selected (e.g., by the system or the user) computer program (e.g., Windows XP autorun function), from peripheral device storage 140. Additionally, in some implementations, host device 120 can include a network connection (e.g., DSL, cable, dialup, LAN, VPN, cellular, or WiFi), to enable features of the platform software 130 (e.g., acquiring updates, acquiring remote user data, or exposing device functionalities to other devices accessible using the network connection).

A host device 120 can also include a processor 160 (e.g., an x86 processor in a Dell computer) and one of more user input devices (e.g., a keyboard, mouse, or touchpad). The processor 160 can be coupled to the peripheral interface 150 and the processor 160 can be operable for running a native environment. The host device 120 can include a memory for storing instructions which when executed by the processor 160 cause the processor to perform certain operations (e.g., launching the virtual machine monitor on the SSD). The storage 198 in the host device 120 can also include an operating system 190 and a temporary directory 195.

In some implementations, the software to run a virtual machine (e.g., a virtual machine monitor), can be pre-installed on the host. In some implementations, the platform software 130 can include components (e.g., code), capable of checking (e.g., scanning) the host device 120 (e.g., for host device characteristics and capabilities), and selecting available software on the peripheral device 110 compatible with the host device 120.

Figure 2A:
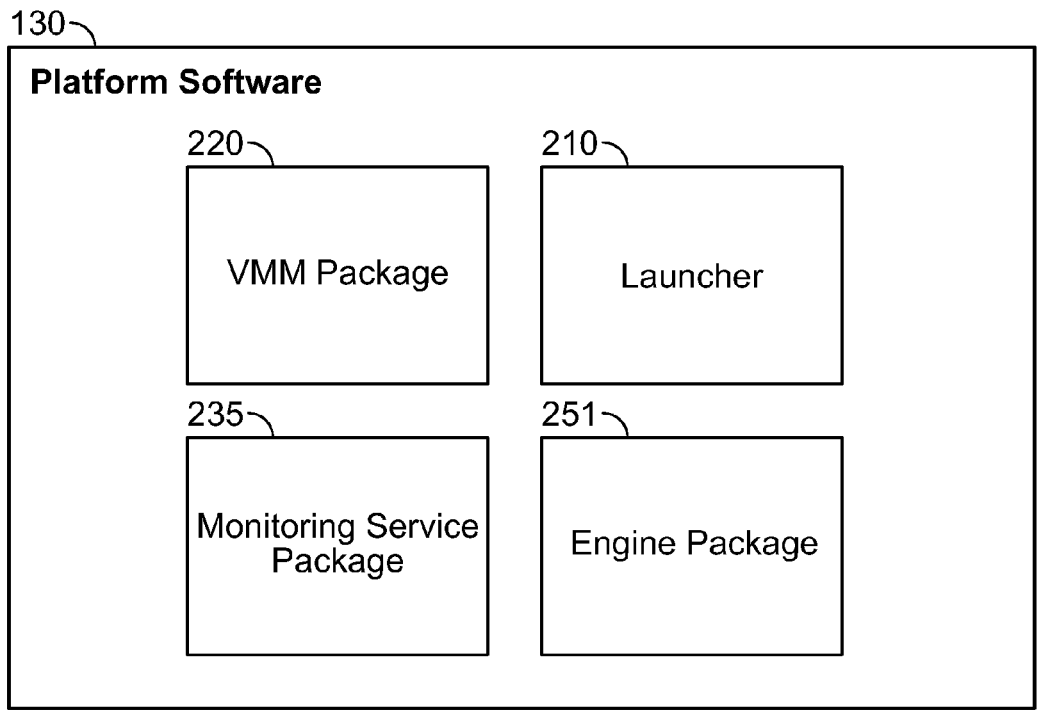
FIG. 2A illustrates example platform software.
Figure 2B:
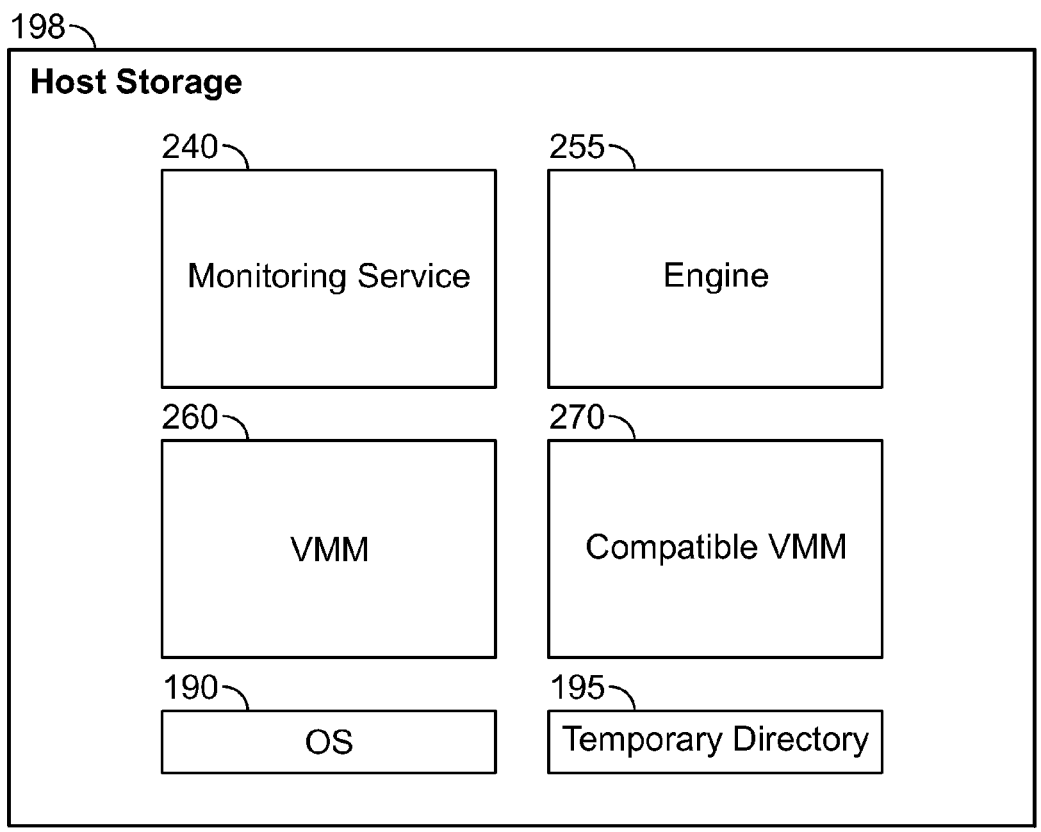
FIG. 2B illustrates example host storage.

In some implementations, when a peripheral device 110 is attached to a host device 120 (e.g., a host computer), the platform software 130 is accessed from the peripheral device storage 140 by the software on the host device 120 over the peripheral interface 150. The platform software 130 is then launched on the host device 120. FIG. 2A illustrates example platform software 130. FIG. 2B illustrates example host storage 198. In some implementations, platform software 130 is distributed on the peripheral device as a launcher 210, a VMM package 220, and a monitoring service package 235. For purposes of this description, the VMM once ready to run (e.g., installed on the host), will be referred to as VMM 260. Additionally, monitoring service package 235 once ready to run (e.g., placed on the host), will be referred to as monitoring service 240.

The VMM package 220 can be an installer (e.g., an MSI installer or RPM package), for the VMM. The VMM package 220 can be an executable installer. The VMM package 220 can be any set of files that can be copied and transformed to install a VMM 260. In some implementations, the VMM package 220 can be any files of VMM software operable to be run directly from the peripheral device storage 140 (e.g., without being copied to the host device storage 198).

The monitoring service package 235 and engine package 251 in platform software 130 (e.g., located on a peripheral device 110), are packages comprising functionalities similar to those functionalities comprising monitoring service 240 and engine 255 in host device storage 198. The monitoring service package 235 and the engine package 251 can comprise an executable installer, installer packages, or a set of files. In some implementations, the monitoring service package 235 and the engine package 251 can run on the host operating system 190 from the peripheral device storage 140. In some implementations, the installer for the monitoring service package 235 is built-in to the launcher 210.

A compatible VMM 270 is a VMM that is present on the host (e.g., when the peripheral device 110 is attached), and capable of running a VM 180 from the peripheral device 110. In some implementations, the monitoring service 240 may choose to use an existing compatible VMM 270 instead of installing a VMM 260 (e.g., to improve performance, if the two VMMs cannot co-exist on the host device). In some implementations, monitoring service 240 may determine that VMM 260 is a fully compatible upgrade to compatible VMM 270 and replace compatible VMM 270 with VMM 260. In some implementations, VMM 260 and compatible VMM 270 can co-exist on the host device. In these cases, the system may choose to run VM 180 on VMM 260 for greater compatibility or uniformity of user experience.

The launcher 210 can install the monitoring service package 235 into host storage 198 (e.g., into temporary directory 195), yielding monitoring service 240 in host storage 198. Once the monitoring service 240 exists on the host storage 198, the launcher 210 can start the monitoring service 240. The launcher 210 can pass a name (e.g., a path or volume ID), for the peripheral device 110 to the monitoring service 240 (e.g. using command line arguments, a file, or a pipe).

In some implementations, the monitoring service 240 performs a check to detect a compatible VMM 270 on the host device 120. If no compatible VMM 270 is found, a compatible VMM package 220 is automatically copied and installed onto the host device 120 from the peripheral device 110. In some implementations, the user can choose a VM 180 to launch (e.g., from the peripheral device storage 140). In other implementations, a default VM 180 can be set to launch in advance by the user or by the system (e.g., if the user has only used one VM 180).

If a compatible VMM 270 is detected on the host device 120, then the chosen VM 180 can be run by the host device VMM 270. If a compatible VMM 270 is not detected on the host device 120, a compatible VMM package 220 is automatically copied and installed onto the host device 120, and then the chosen VM 180 is automatically launched on the host device 120. In some implementations, a VM 180 is automatically launched only after the VMM package 220 installation is completed. In some implementations, a VM 180 is automatically launched during installation of the VMM package 220 (e.g., after all the critical files have been installed and some less critical files are being copied).

In some implementations, the launcher 210 on the peripheral device 110 is initiated by the insertion of the peripheral device 110 into the host device 120 (e.g., when the operating system on the host device 120 is configured to automatically run programs from a peripheral device 110). In some implementations, the monitoring service 240 installs and in some cases launches engine 255 comprising a user interface for selecting, configuring, or otherwise manipulating one or more VMs 180 (e.g., the Moka5 LivePC Engine). In some implementations, the monitoring service 240 and the engine 255 are in the same executable (e.g., when the monitoring service package 235 and the engine package 251 are the same package). In other implementations, the monitoring service 240 and engine 255 are in separate executables. In some implementations, the code to change the file system, registry, and other system structures of the host device 120 (e.g., to facilitate the install of the VMM package 220), is located inside the monitoring service 240. In other implementations, code external to the monitoring service 240 provides this function (e.g., MSI installer, RPM). In some implementations, the user interface of the engine 255 is presented first and the VMM install is initiated when the user uses the user interface to run a VM 180.

In some implementations, the install of the VMM package 220 is done in the background while the user interface loads (e.g., from the peripheral device 110), and during user interaction with the user interface (e.g., during a user session). In some implementations, the engine package 251 is copied and installed to the storage 198 on the host device 120 before the VMM package 220 is installed into the storage 198 on the host device 120. The user interface can then be initialized on the host device 120 while the VMM package 220 is being copied and installed. In some implementations, when the user interface is closed (e.g., by the user or by the occurrence of a failure condition), the system terminates the user session.

In some implementations, when the peripheral device 110 is attached to the host device 120, the host device 120 presents a user interface to the user including a list of options (e.g., run a VM 180) for the user to choose from. When the user selects an option (e.g., by clicking on the option), the system invokes the launcher 210. In some implementations, the user interface presented to the user can include an icon (e.g., representing a peripheral device 110 or a launcher 210 on a peripheral device 110), and the user can start the launcher 210 by activating (e.g., clicking on), the icon.

Figure 3:
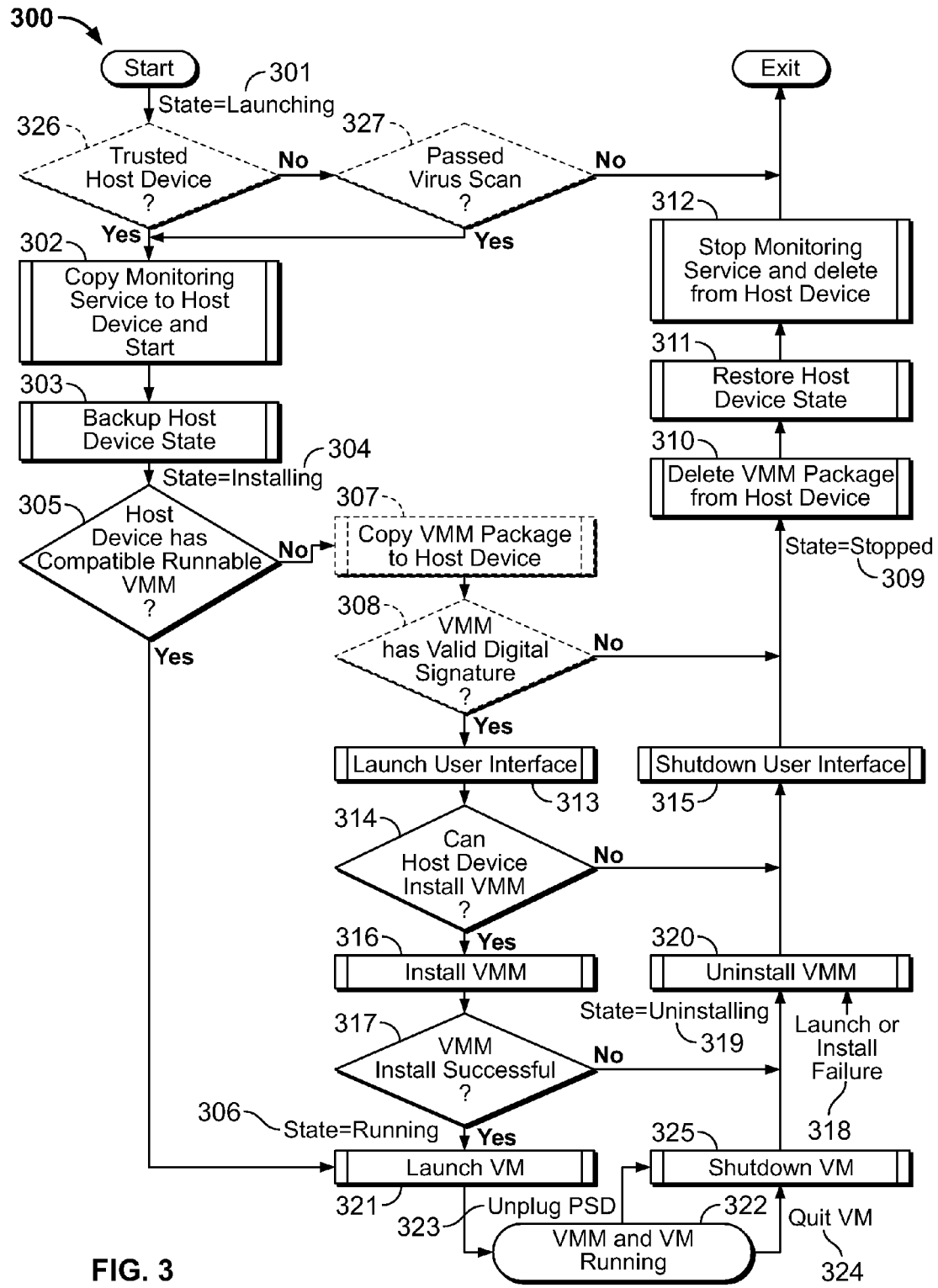
FIG. 3 shows a flowchart of an example method for automatically installing and uninstalling a virtual machine monitor.

When the VM 180 stops or the peripheral device 110 is removed from the host device 120, the temporarily installed VMM 260 can be automatically uninstalled (e.g., by monitoring service 240 running on the host device 120). In some implementation, the user can choose not to have the VMM 260 automatically uninstalled on a particular host device 120 (e.g., to reduce the overhead of installing and uninstalling a VMM 260). In some implementations, automatic installation of a VMM 260 involves several steps. FIG. 3 shows a flowchart of an example method 300 for automatically installing and uninstalling a VMM 260. For convenience, the method 300 will be described with reference to a system that performs the method 300.

Initialization begins when the user requests the installation of a VMM 260 (e.g., by receiving user input initiating a user session). In some implementations, initialization of a user session occurs when a peripheral device 110 storing a VMM package 220 and a VM 180 is inserted into a host device 120. During initialization, the system sets 301 the current state to launching and the host device 120 (e.g., through user input), starts launcher 210. Launcher 210 copies 302 the monitoring service 240 from the peripheral device 110 to a folder on the host device 120. In some implementations, the folder on the host device 120 can contain one or more copies of one or more files copied from the peripheral device 110 and associated with the VMM package 220. In some implementations (e.g., using a Windows OS), the monitoring service 240 can be placed in the user's startup folder so that monitoring service 240 can be restarted (e.g., after the occurrence of a failure condition). In some implementations, the monitoring service 240 can be registered as a Windows service so that the monitoring service 240 is re-started at boot.

In some implementations, the folder on the host device 120 will be a temporary folder 195 (e.g., a temporary user folder), installed on and located in storage 198 on the host device 120. In those implementations, any files copied from the peripheral device 110 to the temporary folder 195 on the host device 120 can be uninstalled from the host device 120 (e.g., upon termination of the user session). After the launcher 210 effects the installation of monitoring service 240 by copying 302 the monitoring service package 235 onto the host device 120, the monitoring service 240 can start 302.

Starting 302 the monitoring service 240 first facilitates recovery (e.g., by backing up 303 the device host 120 state), in the event an uninstall is required. For example, when the monitoring service 240 is started, the monitoring service 240 can facilitate the storage of the original host device 120 configuration (e.g., file associations). After the original host device 120 configuration is stored, the host device 120 can be configured to install a VMM package 220 from a peripheral device 110. Additionally, in some implementations, after the host device 120 has completed operations with respect to the VMM 260, the original configuration of the host device 120 can be restored using the stored host device 120 configuration data. In some implementations, the monitoring service 240 can be started 302 later, however, the delay in starting the monitoring service 240 can reduce the ability of the system to initiate clean up after some failure conditions.

The monitoring service 240 can automatically initiate a VMM 260 uninstall upon termination of a user session. For example, the monitoring service 240 can automatically initiate a VMM 260 uninstall if the monitoring service 240 detects that a VM has stopped running, that the peripheral device 110 is removed, or that incomplete install has occurred (e.g., due to the occurrence of a failure condition on the host device 120). This will be described in greater detail below with respect to the automatic uninstall of a VMM 260.

In some implementations, after the monitoring service 240 backs up the host device 120, the VMM package 220 can automatically be installed on the host device 120. First, the system sets 304 the current state to installing. After the current state is set 304 to installing, the monitoring service 240 can attempt to detect 305 a compatible VMM 270. For example, a compatible VMM 270 is a VMM capable of running a VM 180 (e.g., located on the peripheral device 110), on the host device 110. The system can detect 305 a compatible VMM 270 by looking for its files, registry keys, services, or some combination thereof. Alternatively, the system can detect 305 a compatible VMM 270 by querying one or more operating system installer interfaces to see if a compatible VMM 270 is installed.

In some implementations, if a compatible VMM 270 exists on the host device 120, the monitoring service 240 can optionally launch a user interface. In some implementations, if a compatible VMM 270 exists on the host device 120, the system can set 306 the current state to running, and the VMM can execute (e.g., run) the VM 180 on the host device 120. When a compatible VMM 270 exists on the host device 120, an automatic install of a VMM package 220 from the peripheral device 110 is unnecessary. In some implementations, the monitoring service 240 can optionally determine whether the user has sufficient security privileges to run compatible VMM 270 or whether the host software policy allows the running of compatible VMM 270. If a compatible VMM 270 does not exist on the host device 120, the current state remains at installing, and the monitoring service can copy 307 a VMM package 220 to the host device 120.

In some implementations, if a compatible VMM 270 does not exist on the host device 120, the monitoring service 240 can optionally check to see if a VMM package 220 can be installed onto the host device 120. For example, the monitoring service 240 can optionally ask 308 the operating system 190 on the host device 120 whether the user has sufficient security privileges to install the VMM package 220 or whether the host software policy allows the installation of VMM package 220 (e.g., a valid digital signature). Additionally, the monitoring service 240 can check to see if the VMM package 220 is compatible with the operating system 190 and any application software located on the host device 120. In some implementations, before the VMM package 220 is installed and run on the host device 120, the host device 120 can check the signature of the VMM package 220 to determine whether the signature is valid.

If the monitoring service 240 detects that the VMM package 220 does not have sufficient security privileges, the system sets 309 the current state to stopped and deletes 310 any VMM package 220 copied to the host device 120. Additionally, the monitoring service 240 restores 311 the original state of the host device 120 (e.g., by reinstating any overwritten files or settings). In some implementations, reinstatement includes restoration of the file association for the VM 180 descriptor file (.lpc) on the host device 120. Following the restoration 311 of the original state of the host device 120, all remaining files copied to the host device 120 (e.g., the monitoring service 240 binary and any remaining VMM files), can be deleted 312 by the monitoring service 240 after which the monitoring service 240 stops 312.

If the monitoring service 240 detects that the VMM package 220 does have sufficient security privileges, the monitoring service 240 can launch 313 a user interface. The monitoring service 240 can detect 314 whether the host device 120 can install the VMM package 220. If the host device 120 can not install 316 the VMM package 220, the monitoring service 240 shuts down 315 the user interface. Additionally, the system sets 309 the current state to stopped and deletes 310 any VMM package 220 copied to the host device 120. As noted above, the monitoring service 240 then restores 311 the original state of the host device 120, and all remaining files copied to the host device 120 can be deleted 312 by the monitoring service 240 after which the monitoring service 240 stops 312.

If the host device can install 314 the VMM package 220, the monitoring service 240 installs 316 the VMM package 220 to storage 198 on the host device 120. Additionally, the monitoring service 240 can record any files or settings that need to be restored (e.g., when the VMM 260 is removed). For example, if a file association exists (e.g., association for a VM 180 descriptor file (.lpc extension)), the original file can be backed up before installing a new file.

After the VMM package 220 files have been copied 307 to the storage 198 on the host device 120, the monitoring service 240 can perform installation 316 of the VMM package 220. Installation of the VMM package 220 may require the update of registry keys, the enablement of drivers and the starting of services. Some keys, drivers and services are mandatory and others are optional. In some implementations, to minimize installation time and footprint, only the VMM package 220 components needed to execute any VMs 180 on the peripheral device 110 are installed 316.

The monitoring service 240 next determines 317 the success of the VMM package 220 installation. If the VMM install 316 was not successful (e.g., an occurrence of a launch or install failure condition 318), the system sets 319 current state to uninstalling, and the monitoring service 240 uninstalls 320 the VMM 260 from the host device 120 (e.g., in the background). The monitoring service 240 shuts down 315 the user interface. Additionally, the system sets 309 the current state to stopped and deletes 310 any VMM 260 installed on the host device 120. As noted above, the monitoring service 240 then restores 311 the original state of the host device 120, and all remaining files copied to the host device 120 can be deleted 312 by the monitoring service 240 after which the monitoring service 240 stops 312.

If the VMM install 316 is successful, the system sets 306 the current state to running, and launches 321 a VM 180 from the peripheral device 110 using the VMM 260. The VM 180 and VMM 260 then run 322 in the system until the occurrence of a condition which causes them to stop (e.g., the peripheral device is unplugged 323, the VM 180 ends, or the user quits 324 the VM 180). If a condition occurs which causes the VM 180 to stop running 322, the monitoring service 240 shuts down 325 the VM 180.

Additionally, the system sets 319 current state to uninstalling, and the monitoring service 240 uninstalls the VMM 260 from the host device 120 (e.g., in the background). The monitoring service 240 shuts down 315 the user interface. Additionally, the system sets 309 the current state to stopped and deletes 310 any VMM package 220 stored on the host device 120. As noted above, the monitoring service 240 then restores 311 the original state of the host device 120, and all remaining files copied to the host device 120 can be deleted 312 by the monitoring service 240 after which the monitoring service 240 stops 312.

In some implementations, if the install 316 or uninstall 320 is interrupted at any time (e.g. by a power failure), the monitoring service 240 is configured to run and clean-up (e.g., steps 320, 310, 311, and 312 of FIG. 3), the state (e.g., on the next boot of the host device 120 or the next login of the user). In some implementations, a VMM 260 uninstall 320 starts immediately after all instances of the VMM 260 stop running. In some implementations, the monitoring service 240 will detect that all instances of the VMM 260 have stopped running (e.g., being notified while waiting on the handle of the VMM process). In some implementations, a VMM 260 uninstall 320 occurs when the user shuts down the VM and the user interface. In these implementations, step 315 becomes a null operation because the user interface has already been shut down by the user. In some implementations, the user interface can notify the monitoring service 240 that the user interface has been shut down (e.g., by sending an inter-process message to a named pipe or a remote procedure call). In some implementations, the VMM 260 uninstall 320 starts after the peripheral device 110 has been removed 323.

Sensitive private data can be located on the peripheral device 110. Some users do not want their private data to be accessible to foreign applications, viruses, or keystroke loggers on the host device 120. Additionally, the host device 120 must trust the peripheral device 110 before allowing the peripheral device 110 to automatically instantiate programs and virtual appliances for the user on the host device 120. Thus, in some implementations, a trust determination 326 can be made while the state is still set 301 to launching.

If the host device 120 is untrusted, viruses or spyware can capture user interactions with the VM 180. For example, keystroke loggers can capture user input of sensitive information (e.g., passwords and personal information). Additionally, some screen capture programs can spy on what the user is viewing. To counter such attacks, a keychain can start a virus and/or spyware scanner 327 and run the VM 180 only if the untrusted host device 120 is found to be clean.

In some implementations, the host device 120 operating system 190 and software can be verified before accessing the peripheral device 110. For example, validated software can be digitally signed to ensure that it has not been tampered with or additional virus or spyware has been installed. In one implementation, software validation can be determined by computing a cryptographic hash function (e.g., MD5, or Message-Digest algorithm 5), on all the files that comprise the dedicated host device 120, including executables and shared libraries. In one embodiment, the expected list of files on the host device 120 can be compared against the actual list of files on the host device 120 to ensure that the lists of files are exactly the same. In one embodiment, validated software can be placed on an inaccessible read-only storage device. These techniques can be used in combination when validating software on the host device 120.

In some implementations, the VMM 260 will only run on a trusted host device 120 with a valid digital signature (e.g., a signature rooted in trusted, secured hardware). A secure, encrypted exchange of digital signatures can be used to establish trust (e.g., create assurance that the digital signatures are not compromised by a third party). In some implementations, a trusted VMM 260 does not perform accesses to user data files or resources on the host device 120. The VMM 260 can isolate the VM 180 from the host device 120, preventing the VM 180 from performing malicious operations (e.g., accessing and deleting files on the host device 120). To establish a trusted VMM 260, a digital signature (e.g., Microsoft Authenticode or an RPM signing), of an existing compatible VMM 270 or automatically installed VMM 260 can be computed. Additionally, a recognized digital signature can be used to certify that the VMM package 220, the VMM 260, or the compatible VMM 270 has not been tampered with.

Figure 4:
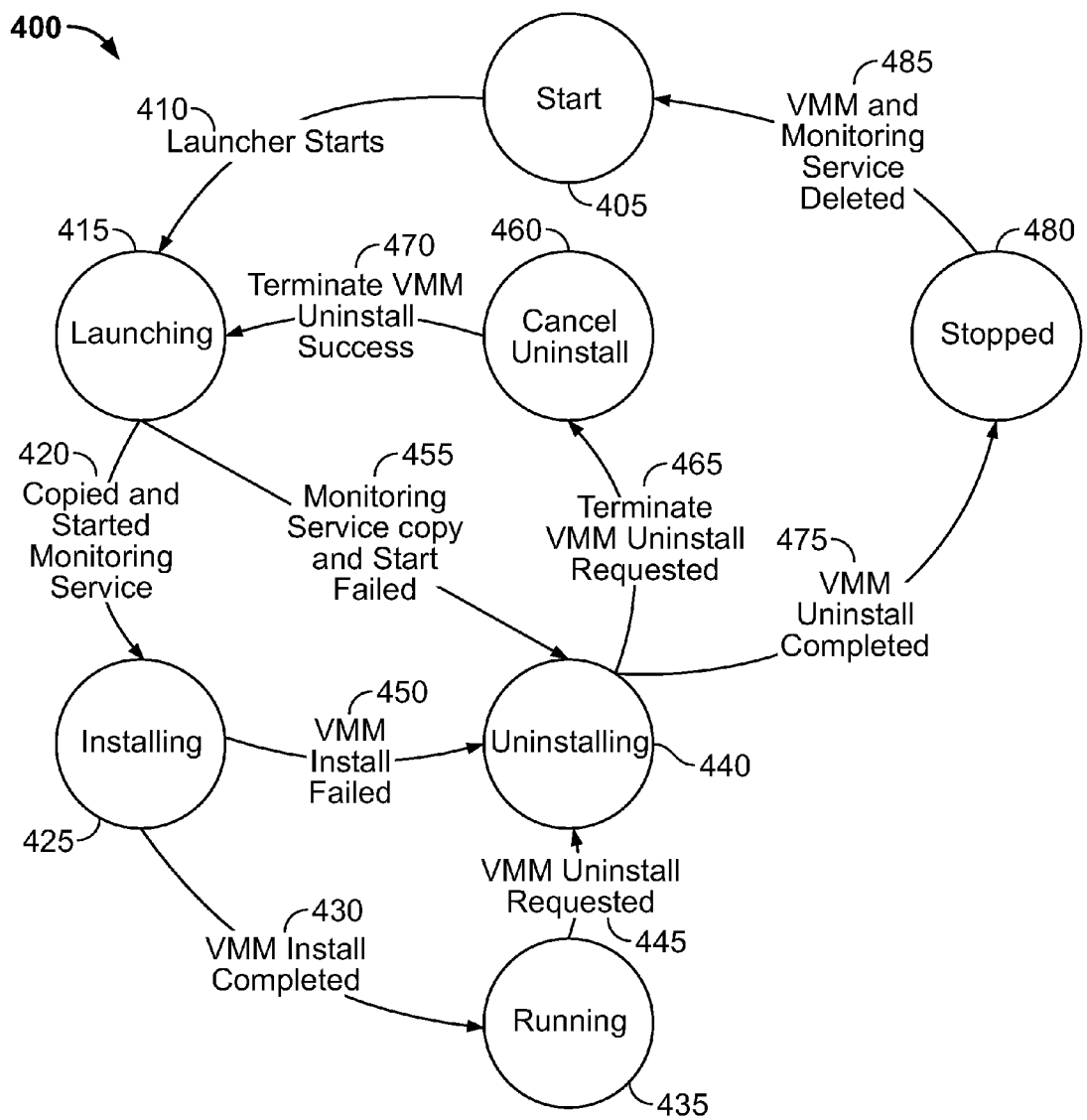
FIG. 4 is a state diagram illustrating various states for automatic VMM installation and uninstallation.

FIG. 4 is a state diagram 400 illustrating various states for automatic installation and uninstallation of VMM 260. As noted above, the state of the system 100 (e.g., launching, installed, stopped, etc.), is recorded during automatic installation of a VMM 260. The state of the system can be stored in storage 198 (e.g., persistent storage) on the host device 120. In some implementations (e.g. using Windows OS), the state can be stored in a Windows Registry entry (e.g., a key or a value). In some implementations, the state is stored in the file system. In some implementations, the state is not explicitly stored but can be automatically deduced by the monitoring service 240 (e.g., by examining the device host storage 198 to determine whether a user interface or VMM is currently installed or whether a backup of the file associations exists). The state provides coarse level tracking of the VMM 260 installation. Tracking of VMM 260 installation provides a recovery starting point if the VMM 260 installation or monitoring service 240 unexpectedly terminates (e.g., if a failure condition occurs). The VMM 260 installation can be a single transaction. The failure of any step of the VMM 260 installation causes the VMM 260 installation to halt and the changes (e.g., to the file system and registry in storage 198 on host device 120) done up to that step are undone.

As noted above with respect to FIG. 3, the system starting 405 state is set to a launching 415 state after the launcher 210 is started 410 (e.g., by insertion of the of the peripheral device 110 into the host device 120 or by user activation, or both). After the launching 415 state is set, the monitoring service 240 is copied 420 to the host device 120 and started 420 which causes the system to set the state to installing 425. When the VMM 260 install is completed 430, the system will set the state to running 435. In certain instances, the system will set the state to uninstalling 440. For example, the system will set the state to uninstalling 440 when a VMM 260 uninstall is requested 445, when a VMM install fails 450, or when the copying 420 and starting 420 of the monitoring service 240 fails 455. When the system sets the state to uninstalling 440, the system can cancel 460 the uninstall. For example, this can happen in some implementations when a new monitoring service 240 is started and requires the use of the existing VMM host install.

If the system successfully cancels 460 the uninstall (e.g., the termination of the VMM 260 uninstall is successful 470), then the system can set the state to launching 415 again. Additionally, when the system sets the state to uninstalling 440, the system can remain in the uninstalling 440 state until the VMM 260 uninstall is completed 475. When the VMM 260 uninstall is completed 475, the monitoring service 240 is stopped 480 and the VMM package 220 and the monitoring service 240 are deleted 485 from the host device 120. Deletion 485 of the VMM package 220 and the monitoring service 240 from the host device 120 can cause the system to return to a starting state 405.

In some implementations (e.g., when determining whether it is safe to uninstall the VMM 260), the monitoring service 240 needs to first determine whether it (the current monitoring service 240) installed the VMM 260 on the host system 120 or whether the VMM 260 was already present on the host system 120. Because of the potential for a crash and reboot of the host device 120 during a user session, this determination by the monitoring service 240 should be more than a flag in RAM.

To facilitate a determination regarding the installation of a VMM 260, a session ID can be written into a well-known location in a registry or file system (e.g. the VMM 260 program files directory or VMM 260 registry entries) after a VMM 260 install 316. Additionally, the monitoring service 240 can be informed of the session ID, even across reboots (e.g., by writing the session ID to a file or registry entry that the monitoring service 240 reads or by making the session ID a command line argument to the monitoring service 240). The monitoring service 240 can compare the session ID associated with the VMM 260 to its own session ID (e.g., a session ID associated with the monitoring service 240), to determine whether it (the monitoring service 240) installed the VMM 260.

In some implementations, VMM package 220 can be modified to integrate the writing of the session ID into the VMM package 220, reducing or eliminating any time in which the VMM 260 is accidentally left behind or uninstalled from the host device 120. For example, the VMM package 220 can be modified such that the modified VMM package 220 writes the session ID into a well-known location in the registry or file system. Any additional writes by the modified VMM package 220 (e.g., to modify placement of the session ID, for example, during the install 316 portion), can be undone during uninstall. In another example, each install of VMM package 220 can place the session ID in the name or other metadata field associated with the installed package.

In some implementations, the session ID can be specified at install time (e.g., as a parameter), so that the actual install package doesn't need to be modified on each client. In some implementations, the system can make it more difficult for the user to disable the uninstaller by requiring that an obscure value (e.g., a value not likely to be known by the user but known to monitoring service 240), be passed to the uninstaller registered by the VMM 260 on the host device 120.

Sometimes the monitoring service 240 needs to determine whether other applications are relying on the presence of the VMM 260. The most robust approach is to have each application register its interest in the VMM 260 (e.g., by adding its name to a list or increasing a reference count), as part of an application's install process. The application that takes the list to zero (e.g., the last application to be uninstalled), could then be responsible for uninstalling 320 the VMM 260. A file lock or other shared lock could also be used to co-ordinate the update of the list when simultaneous installs/uninstalls are possible.

In some implementations, when a monitoring service 240 needs to determine whether other applications are relying on the presence of the VMM 260, the monitoring service 240 can scan the system on the host device 120 (e.g., the registry Add/Remove programs or the Program Files directory or the Start->Programs menu), at startup and at uninstall time for applications that are known to want to use the VMM 260. In these cases, the monitoring service 240 would not uninstall 320 the VMM 260 if applications wanting to use the VMM 260 have appeared between the startup and the uninstall time.

Sometimes a user may want to physically re-couple a peripheral device to a host device if requested to do so by the system (e.g., when the user physically disturbs the peripheral device or when the user otherwise removes the peripheral device before all application activity has ended).

For example, when a peripheral device with storage is inserted into a host device, a file system on the peripheral device will appear in the host device operating system file namespace (e.g., under a directory or a drive letter). Clients (e.g., applications) using the host device operating system storage interface can read and write (e.g., from the drives or directories). Clients can use, for example, the standard operating system function calls (e.g., to open, read, write, close the files). When a peripheral device is decoupled from a host device, the files from the peripheral device can disappear from host device operating system file namespace. Any open files can be forcibly closed by the host device operating system (e.g., the host device operating system will abort I/Os in progress and return an error).

Client response to these errors can include the display of one or more error messages to the user and the termination of any current activities related to the files that have disappeared. If clients run from the decoupled peripheral device storage, the host device operating system may terminate the clients immediately. In some implementations, the host device operating system may terminate the clients when the clients attempt to access code or data that hasn't been loaded from the peripheral device.

Figure 5:
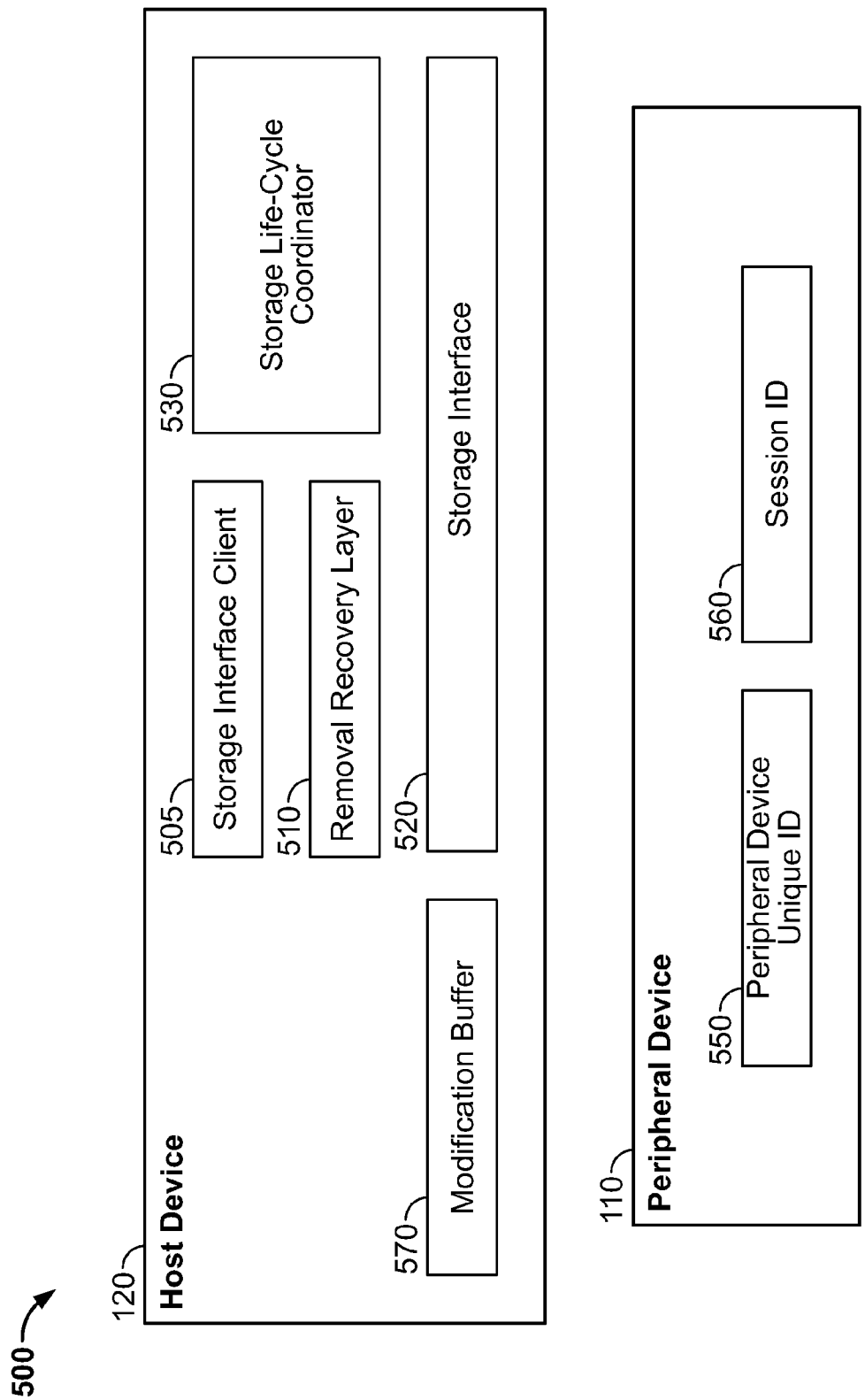
FIG. 5 shows an example system for allowing the recovery from an unexpected removal of a peripheral device.

FIG. 5 shows an example system 500 for allowing the recovery from an unexpected removal of a peripheral device 110. In some implementations, a removal recovery layer 510 is interposed between a storage interface client 505 (e.g., an application), and a storage interface 520 (e.g., an operating system storage interface like POSIX open, read, write, close or Windows CreateFile, ReadFile, WriteFile). The removal recovery library 510 can be dynamically inserted between the storage interface client 505 and the storage interface 520 using well-known techniques including but not limited to proxy DLLs, IAT patching, rewriting function entry points (a la Microsoft® Research's Detours), or rewriting system call thunks. The removal recovery layer 510 includes an interface that can be compatible with storage interface 520. The removal recovery layer 510 additionally includes the added capability of recovering from the sudden removal of peripheral device 110 from host device 120. In some implementations, the removal recovery layer 510 is a dynamic link library that is injected into the processes holding the storage interface 520 clients.

In some implementations, a storage life-cycle co-ordinator 530 centralizes certain functions (e.g., informing the user of the sudden removal of peripheral device 110, accepting user feedback on whether the user wishes to reinsert peripheral device 110, timing out the recovery while waiting for reinsertion of peripheral device 110, and coordinating the retry against a reinserted peripheral device 110). In some implementations, the storage life-cycle coordinator 530 has its own thread of execution and the removal recovery layer 510 executes within the context of the storage interface client 505 thread.

In some implementations, when the user removes peripheral device 110, the system displays a window asking the user to reinsert the peripheral device 110. After a timeout or if the user indicates that the peripheral device will not be reinserted (e.g. by interacting with a button in the user interface), the window can disappear and the removal recovery layer 510 can propagates error messages back to any paused clients. In some implementations, the system can terminate paused clients. In some implementations, the storage life-cycle coordinator 530 can instruct the removal recovery layer 510 to propagate error messages. If the user re-couples (e.g., reinserts) the peripheral device into the host device prior to the occurrence of a timeout, then the removal recovery layer 510 can retry the pending I/O against the reinserted peripheral device 110.

In some implementations, a modification buffer 570 can record changes that may not have made it to the peripheral device 110), and that are cached below the storage interface 520 (e.g., are cached in an operating system buffer cache). The unwritten cached changes (along with pending writes) can be discarded from memory by the storage interface 520 on sudden removal of peripheral device 110. The modification buffer 570 allows the system to reissue the changes to the storage interface 520. In some implementations, the storage interface 520 immediately discards from memory changes to the peripheral device 110 making the modification buffer 570 unnecessary. In some implementations, the modification buffer 570 is a cache implemented in a memory region shared amongst all storage interface clients accessing the peripheral device 110. In some implementations, entries in the modification buffer 570 can be removed once the storage interface 520 indicates (e.g., a successful reply to a sync, fsync, or close), that the entries (e.g., changes) have been written to the peripheral device 110.

The storage life-cycle coordinator 530 can also detect a disconnect or a reconnect. The storage life-cycle coordinator 530 can poll and/or receive notifications from a storage interface 520 (e.g., regarding the attachment and detachment of peripheral devices 110). In some implementations, the storage life cycle coordinator 530 can poll by periodically enumerating peripheral devices 110 on the system using the storage interface 520. In some implementations, the storage life-cycle coordinator 530 can poll by attempting to periodically read or write peripheral device 110. In some implementations, the storage life-cycle coordinator 530 can write a session ID to the peripheral device 110 and check the session ID upon reconnect of the peripheral device 110 to the host device.

In some implementations, the storage life-cycle coordinator 530 can write the information on where to find a reconnected peripheral device 110 in a manner that can be visible to the removal recovery layer 510 (e.g., through a file in the file system or shared memory). In some implementations, the storage life-cycle coordinator 530 can notify the removal recovery libraries 510 when I/Os are ready to be retried (e.g., by using a cross-process object like an Event or a pipe). In some implementations, the storage life-cycle coordinator 530 can display one or more notifications to the user and react to user input (e.g., regarding abandoning a wait to reconnect the storage device). In some implementations, the storage life-cycle coordinator 530 can time out the reinsertion wait and can notify the removal recovery libraries 510 not to retry the I/Os. In some implementations, the storage life-cycle coordinator 530 writes the contents of modification buffer 570 out to peripheral device 110 through the storage interface 520 before notifying the removal recovery libraries 510.

Sometimes it may be desirable to detect whether the same peripheral device 110 has been reinserted (e.g., to determine whether to attempt a retry against the newly inserted peripheral device 110). In some implementations, the storage life-cycle coordinator 530 can look for a peripheral device unique identifier 550 on peripheral device 110. In some implementations, the peripheral device unique identifier 550 can be stored in a file. In some implementations, the peripheral device unique identifier 550 can be part of the device configuration data (e.g., a peripheral or USB device ID).

Sometimes, it may be desirable to detect when a user detaches a peripheral device 110 from a first host device, attach peripheral device 110 to a second host device and then reattach peripheral device 110 back into the first host device (e.g., a travel). A travel can cause the data on peripheral device 110 to become inconsistent with the data buffered by clients (e.g., using the peripheral device 110), and the removal recovery library 510. In some implementations, the storage life-cycle coordinator 530 can detect a travel by seeing if a probabilistically unique session ID 560 read from peripheral device 110 on reconnect (e.g., after sudden removal of peripheral device 110 from a host device), corresponds to the session ID the storage life cycle coordinator 530 wrote to peripheral device 110 upon initial connect of peripheral device 110 to host device. In some implementations, each host device visited by peripheral device 110 can write a session ID 560 upon initial connect. In some implementations, once a travel has been detected (e.g., by the storage life cycle coordinator 530), the user is warned (e.g., using a message displayed in the user interface). In some implementations, the system can automatically refuse to use peripheral device 110 and abort all outstanding I/Os.

Figure 6:
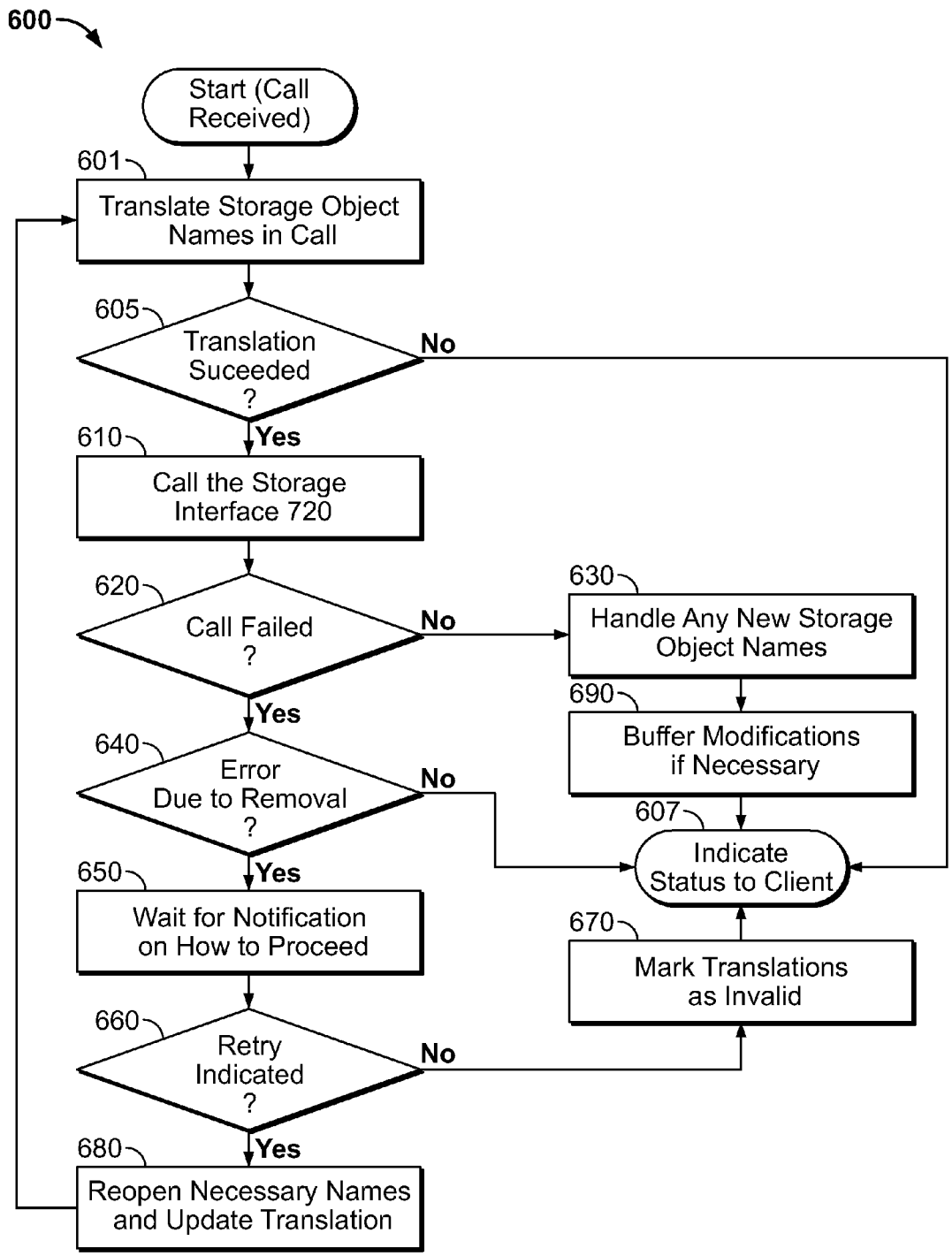
FIG. 6 shows a flowchart of an example method for handling an I/O request from a peripheral device through a removal recovery layer.

FIG. 6 shows a flowchart 600 of an example method for handling an I/O request (e.g., a call), from a storage interface client 505 through a removal recovery layer 510. Upon receiving a storage call, the removal recovery layer 510 can translate 601 the storage object names (e.g., handles or paths), referenced in the call parameters to storage object names that are valid with the storage interface 520. This can be helpful for example, during a reconnect, when the peripheral device 110 may appear at a different path in the file system and/or the removal recovery layer needs to re-open one or more storage objects invalidated by a sudden peripheral device 110 disconnect (e.g., where the names of the re-opened storage objects are often different from the names of the original storage objects).

This translation can be effected, for example, by a table mapping from removal recovery layer 510 names to storage interface 520 names. In some implementations, if a translation does not appear in the table, the name passed can be assumed to be a storage interface 520 name and no translation is done on that name. In some implementations, a translation can be marked as invalid. In order to translate pathnames, in some implementations, the removal recovery layer 510 can translate a relative path passed in with the call to a full pathname. The removal recovery layer 510 can then examine whether a prefix of the path corresponds to an old name for the peripheral device 110 and rewrite it to point to the new name for the peripheral device 110.

After the translation 601, the system checks to see if any errors occurred. If there were errors in the translation 605, then the call can return to the storage interface client 505 with an error indicating 607 a bad storage object name. If there are no errors in translation (e.g., no entries are marked invalid), the removal recovery layer 510 can call 610 the storage interface 520. If the storage call succeeds 620, in some implementations, the removal recovery layer 510 may need to update 630 its translation tables with any new storage object names created as part of the call. In some implementations, the removal recovery layer 510 can issue its own storage object names and replace the storage object names in the return values that are sent to the storage interface client 505. If the call involved any modifications that will be buffered in RAM and potentially flushed by sudden peripheral disconnect (e.g., writes that are cached in the buffer cache), the modifications are also shadowed 690 in modification buffer 570.

If the call returns to the storage interface client 505 with an error, and the error returned by storage interface 520 was not due to removal 640, then the system can propagate the error back to the client. In some implementations, the removal recovery layer 510 can check whether the error was due to removal by asking the storage interface layer 520 whether the peripheral device 110 is still attached (e.g., by probing the root path of the peripheral device 110). In some implementations, the removal recovery layer 510 can check for errors which do not typically occur during a peripheral device 110 removal (e.g., by checking for the presence of the peripheral device 110 in those cases).

If the call returns to the storage interface client 505 with an error indicating a bad storage object name, and the error was due to removal of the peripheral device 110, then the removal recovery layer 510 waits 650 for notification from the storage life-cycle coordinator 530 on how to proceed. In some implementations, the removal recovery layer 510 can pause the current thread of execution while waiting for the notification. In some implementations, before waiting, the removal recovery layer 510 can notify the storage life-cycle coordinator 530 (e.g., by using some synchronization object like an Event, pipe, signal).

If the notification from the storage life-cycle coordinator 530 indicates that the removal recovery layer 510 should not retry 660, then, in some implementations, the removal recovery layer 510 marks 670 all the translations associated with the storage device as invalid. If the notification from the storage life-cycle coordinator 530 indicates that the removal recovery layer 510 should retry 660, then the removal recovery layer 510 can update removal recovery layer 510 tables with new storage object names for the peripheral device 110. In some implementations, the reopening of storage objects can be done as needed (e.g., as part of step 601). In some implementations, the storage life-cycle coordinator 530 can publish a data structure indicating the new names (e.g., new path or new volume name), for reinserted peripheral device 110. After step 680 is completed, the removal recovery layer 510 can attempt to rerun 601 the call with the new translations.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard, a pointing device, e.g., a mouse or a trackball, or a musical instrument including musical instrument data interface (MIDI) capabilities, e.g., a musical keyboard, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Additionally, the invention can be embodied in a purpose built device.

What is claimed is:

1. A method, comprising:
   initiating a user session on a host device, the user session being initiated upon the insertion of a peripheral device into the host device, the peripheral device storing a virtual machine monitor and a virtual machine; and
   automatically installing the virtual machine monitor on the host device;
   the installed virtual machine monitor automatically executing the virtual machine;
   storing pending input/output (I/O) operations for the peripheral device on the host device;
   in response to detecting that the peripheral device has been removed, terminating the user session, wherein the pending I/O operations continue to be stored on the host device;
   in response to detecting that the peripheral device has been re-inserted within a time period of the peripheral device being removed, processing the stored I/O operations for the peripheral device; and

19 in response to detecting that the peripheral device has not been re-inserted within the time period, deleting the stored I/O operations.

2. The method of claim 1 further comprising:
uninstalling the virtual machine monitor using a monitoring service.

3. The method in claim 1, further comprising:
terminating the user session when the peripheral device is removed from the host device.

4. The method of claim 1, further comprising:
terminating the user session when the peripheral device is removed from the host device and a time period has elapsed.

5. The method of claim 1, further comprising:
terminating the user session when the virtual machine stops.

6. The method of claim 1, further comprising:
terminating the user session when a failure condition occurs on the host device.

7. The method of claim 1, further comprising:
terminating the user session when a user interface is closed.

8. The method of claim 1, further comprising:
installing on the host device one or more copies of one or more files associated with the virtual machine monitor; and
uninstalling the one or more copied files.

9. The method of claim 1, further comprising:
storing the original configuration of the host device;
configuring the host device to run the virtual machine monitor from the peripheral device; and
restoring the original configuration of the host device.

10. The method of claim 1, wherein the virtual machine monitor is installed on the host device after trust has been established between the peripheral device and the host device, and wherein the installed virtual machine monitor is capable of preventing the virtual machine from performing malicious operations on the host device.

11. A method, comprising:
initiating a user session on a host device, the user session being initiated upon the insertion of a peripheral device into the host device, the peripheral device storing a virtual machine monitor and a virtual machine;
automatically installing the virtual machine monitor on the host device;
the installed virtual machine monitor automatically executing the virtual machine;
storing pending input/output (I/O) operations for the peripheral device on the host device;
in response to detecting that the peripheral device has been removed, terminating the user session, wherein the pending I/O operations continue to be stored on the host device;
in response to detecting that the peripheral device has been re-inserted within a time period of the peripheral device being removed, processing the stored I/O operations for the peripheral device;
in response to detecting that the peripheral device has not been re-inserted within the time period, deleting the stored I/O operations; and
in response to determining that the user session has been terminated and the time period has expired, automatically uninstalling the virtual machine monitor.

12. A system, comprising:
an interface;
a processor coupled to the interface and operable for running a native environment;

20 a memory for storing instructions, which when executed by the processor, causes the processor to perform operations comprising:
initiating a user session on a host device, the user session being initiated upon coupling a peripheral device with the interface, the peripheral device storing a virtual machine monitor and a virtual machine;
automatically installing the virtual machine monitor on the host device;
the installed virtual machine monitor automatically executing the virtual machine;
storing pending input/output (I/O) operations for the peripheral device on the host device;
in response to detecting that the peripheral device has been removed, terminating the user session, wherein the pending I/O operations continue to be stored on the host device;
in response to detecting that the peripheral device has been re-inserted within a time period of the peripheral device being removed, processing the stored I/O operations for the peripheral device; and
in response to detecting that the peripheral device has not been re-inserted within the time period, deleting the stored I/O operations.

13. The system of claim 12, further comprising actions including:
uninstalling the virtual machine monitor using a monitoring service.

14. The system in claim 12, further comprising actions including:
terminating the user session when the peripheral device is removed from the host device.

15. The system of claim 12, further comprising actions including:
terminating the user session when the peripheral device is removed from the host device and a time period has elapsed.

16. The system of claim 12, further comprising actions including:
terminating the user session when the virtual machine stops.

17. The system of claim 12, further comprising actions including:
terminating the user session when a failure condition occurs on the host device.

18. The system of claim 12, further comprising actions including:
terminating the user session when a user interface is closed.

19. The system of claim 12, further comprising actions including:
installing on the host device one or more copies of one or more files associated with the virtual machine monitor; and
uninstalling the one or more copied files.

20. The system of claim 12, further comprising actions including:
storing the original configuration of the host device;
configuring the host device to run the virtual machine monitor from the peripheral device; and
restoring the original configuration of the host device.

21. A system, comprising:
an interface;
a processor coupled to the interface and operable for running a native environment;
a memory for storing instructions, which when executed by the processor, causes the processor to perform operations comprising:

initiating a user session on a host device, the user session being initiated upon coupling a peripheral device with the interface, the peripheral device storing a virtual machine monitor and a virtual machine;
automatically installing the virtual machine monitor on the host device;
the installed virtual machine monitor automatically executing the virtual machine;
storing pending input/output (I/O) operations for the peripheral device on the host device;
in response to detecting that the peripheral device has been removed, terminating the user session, wherein the pending I/O operations continue to be stored on the host device;
in response to detecting that the peripheral device has been re-inserted within a time period of the peripheral device being removed, processing the stored I/O operations for the peripheral device;
in response to detecting that the peripheral device has not been re-inserted within the time period, deleting the stored I/O operations; and
in response to determining that the user session has been terminated and the time period has expired, automatically uninstalling the virtual machine monitor.

22. A computer-program product tangibly embodied on a non-transitory computer-readable medium for storing instructions, which when executed by a processor, causes the processor to perform operations comprising:
initiating a user session on a host device, the user session being initiated upon the insertion of a peripheral device into the host device, the peripheral device storing a virtual machine monitor and a virtual machine;
automatically installing the virtual machine monitor on the host device;
the installed virtual machine monitor automatically executing the virtual machine;
storing pending input/output (I/O) operations for the peripheral device on the host device;
in response to detecting that the peripheral device has been removed, terminating the user session, wherein the pending I/O operations continue to be stored on the host device;
in response to detecting that the peripheral device has been re-inserted within a time period of the peripheral device being removed, processing the stored I/O operations for the peripheral device; and
in response to detecting that the peripheral device has not been re-inserted within the time period, deleting the stored I/O operations.

23. The computer-program product of claim 22, further comprising:
uninstalling the virtual machine monitor using a monitoring service.

24. The computer-program product claim 22, further comprising:
terminating the user session when the peripheral device is removed from the host device.

25. The computer-program product of claim 22, further comprising:
terminating the user session when the peripheral device is removed from the host device and a time period has elapsed.

26. The computer-program product of claim 22, further comprising:
terminating the user session when the virtual machine stops.

27. The computer-program product of claim 22, further comprising:
terminating the user session when a failure condition occurs on the host device.

28. The computer-program product of claim 22, further comprising:
terminating the user session when a user interface is closed.

29. The computer-program product of claim 22, further comprising:
installing on the host device one or more copies of one or more files associated with the virtual machine monitor; and
uninstalling the one or more copied files.

30. The computer-program product of claim 22, further comprising:
storing the original configuration of the host device;
configuring the host device to run the virtual machine monitor from the peripheral device; and
restoring the original configuration of the host device.

31. A computer-program product tangibly embodied on a non-transitory computer-readable medium for storing instructions, which when executed by a processor, causes the processor to perform operations comprising:
initiating a user session on a host device, the user session being initiated upon the insertion of a peripheral device into the host device, the peripheral device storing a virtual machine monitor and a virtual machine;
automatically installing the virtual machine monitor on the host device;
the installed virtual machine monitor automatically executing the virtual machine; storing pending input/output (I/O) operations for the peripheral device on the host device;
in response to detecting that the peripheral device has been removed, terminating the user session, wherein the pending I/O operations continue to be stored on the host device;
in response to detecting that the peripheral device has been re-inserted within a time period of the peripheral device being removed, processing the stored I/O operations for the peripheral device;
in response to detecting that the peripheral device has not been re-inserted within the time period, deleting the stored I/O operations; and
in response to determining that the user session has been terminated and the time period has expired, automatically uninstalling the virtual machine monitor.

* * * * *